(12) United States Patent
Gunnarsson et al.

(10) Patent No.: US 6,366,001 B1
(45) Date of Patent: Apr. 2, 2002

(54) ROTARY ELECTRIC MACHINE

(75) Inventors: Rune Gunnarsson; Rikard Isby, both of Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/504,035

(22) Filed: Feb. 14, 2000

(30) Foreign Application Priority Data

Feb. 15, 1999 (SE) ............................................... 9900497

(51) Int. Cl.$^7$ ................................................ H02K 3/46
(52) U.S. Cl. ........................................ 310/270; 310/194
(58) Field of Search ........................... 310/270, 58, 61, 310/261, 194, 64; 29/598; 74/573 R

(56) References Cited

U.S. PATENT DOCUMENTS

| | | | | |
|---|---|---|---|---|
| 3,558,950 A | * | 1/1971 | Raybould | 31/266 |
| 3,735,174 A | * | 5/1973 | Bosch et al. | 310/266 |
| 4,143,290 A | * | 3/1979 | Mizukami et al. | 310/270 |
| 4,642,886 A | * | 2/1987 | Muck et al. | 29/598 |
| 4,710,662 A | * | 12/1987 | Balke et al. | 310/204 |
| 4,933,583 A | * | 6/1990 | Ripplinger | 310/156 |
| 5,081,383 A | * | 1/1992 | Kusumoto et al. | 310/59 |
| 5,237,232 A | * | 8/1993 | Kitamura | 310/263 |
| 5,473,213 A | * | 12/1995 | Kahle, Sr. | 310/270 |
| 6,087,745 A | * | 7/2000 | Dreher | 310/58 |

FOREIGN PATENT DOCUMENTS

| | | | |
|---|---|---|---|
| DE | 2436435 A | * | 2/1976 |
| DE | 3443441 A1 | | 6/1985 |
| EP | 0492097 A1 | | 7/1992 |
| FR | 2378393 | * | 9/1978 |
| FR | 2556147 | * | 6/1985 |
| GB | 1396327 | | 6/1975 |
| GB | 2123617 A | * | 2/1984 |

\* cited by examiner

Primary Examiner—Joseph Waks
(74) Attorney, Agent, or Firm—Dykema Gosett PLLC

(57) ABSTRACT

The invention relates to a rotary electric direct current machine having a rotor (8) mounted on a rotor shaft (9) and being provided with axial winding coils, whereby the coil ends are supported by a generally ring shaped rotor coil support (7) that is centered with reference to the rotor shaft and is supported directly at the axial end of the rotor, adjacent the radially outer region thereof. According to the invention the rotary direct current machine is characterized in that the rotor coil support is provided with a surface area that is considerably enlarged in relation to its circumference. The invention also relates to a rotor for such a direct current machine as well as to a rotor coil support.

28 Claims, 5 Drawing Sheets

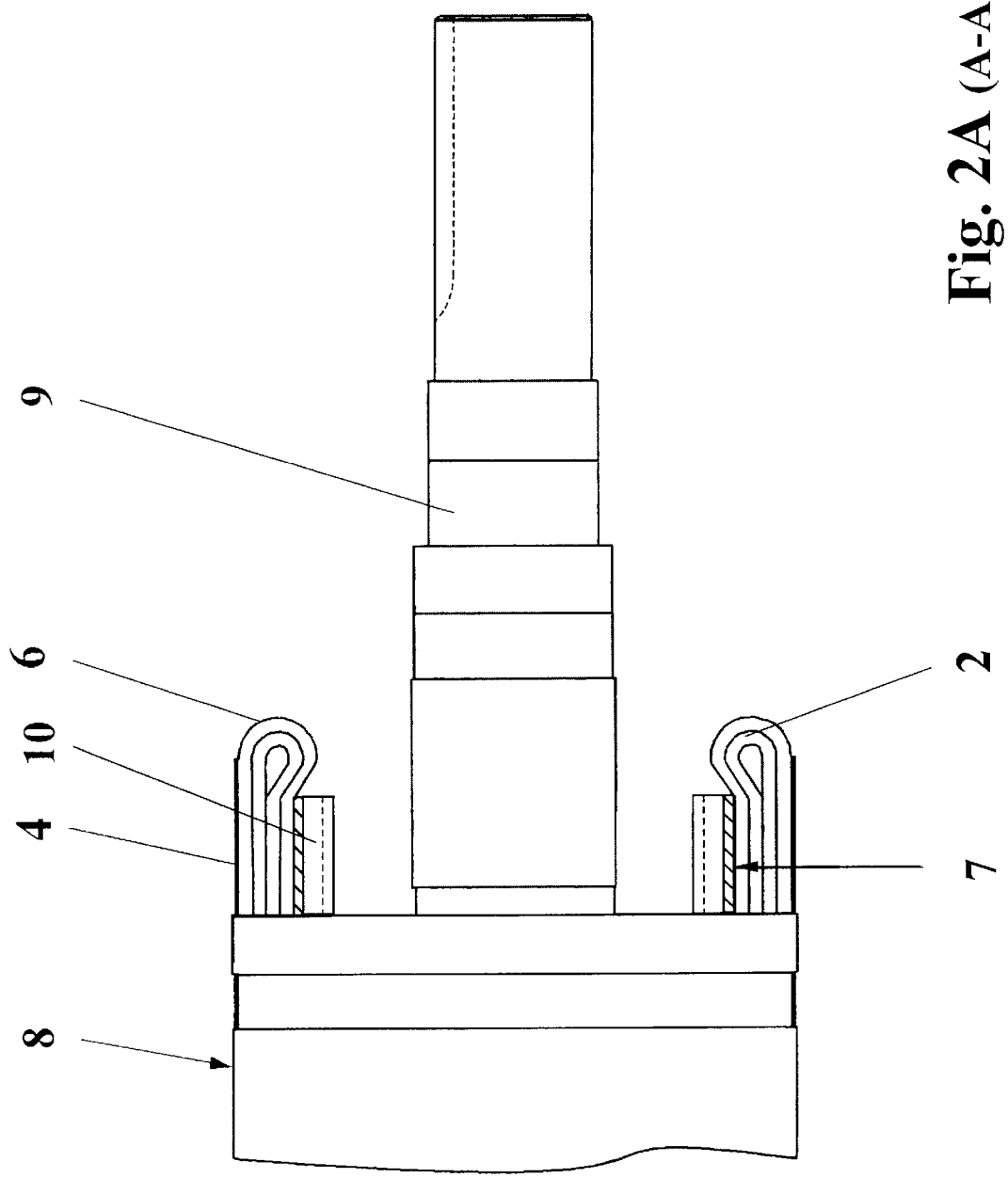

ROTARY ELECTRIC MACHINE

TECHNICAL FIELD

The present invention relates generally to rotary electric machines, and specifically relates to a rotary electric direct current machine as specified in the preamble of the accompanying claim 1, a rotor for such a rotary electric direct current machine according to the preamble of claim 9 and a rotor coil support for a rotor of a rotary electric direct current machine and according to the preamble of claim 17.

BACKGROUND

The development within the general area of rotary electric machines is presently directed towards an ever higher performance utilization, that is a higher and higher output in terms of power and torque, for given machine sizes. One condition of such higher performance is that the cooling of the machine can be made correspondingly more effective, and consequently intense development is carried out in this purpose.

With regard to direct current machines, great improvements have for instance been achieved in the rotor cooling, and perhaps most of all through the advances in the cooling of the rotor plate stack that have been made through the principles described in our Swedish Patent Application no. 9900227-1. These principles relate to the symmetrical positioning of the rotor cooling channels relative to the magnetic flow paths in the rotor, and thereby to the provision of cooling channels in a greater number and closer to the outer circumference of the rotor.

Through this optimization of the cooling of the actual rotor plate stack the development has been carried so far that other parts of the machine, which parts have earlier been regarded as having a satisfactory cooling, are now instead limiting the possible power output of the machine. One such so-called "hot spot" in the machine is those parts of the rotor coils positioned in axial grooves of the rotor, which lie outside the actual rotor plate stack.

In conventionally designed direct current machines, see the enclosed FIG. 1, the major portion of the rotor coil ends 2, that is the end windings, of the rotor 1 lie thermally isolated between a coil support 3 and a rotor coil bandage 4. The general kind of rotor coil support 3 that forms the basis of this invention consists of a relatively thin and light ring of synthetic resin (plastic) or metal that is attached directly to the rotor, in its outer region. In contrast thereto, heavy and material consuming and often cast coil supports also exist within this technical field. The latter type is supported on the rotor shaft 5 and quite different conditions apply thereto.

In rotor coil supports of the kind in question here, it has been quite satisfactory up to now to let the rotor coil ends be cooled by cooling air only on the rotor coil back 6 that is accessible to the cooling air. The conductor length in the rotor coil back constitutes approximately only 20–25% of the total length in the rotor coil ends. Bearing this in mind and considering the above described, general development within this field, said method is not sufficient for allowing the machine taken as a whole, to come even close to being able to benefit from the above described progress that has been achieved regarding the cooling of the rotor plate stack.

To sum up, it may be established that the conventional rotor coil supports have worked well in themselves under the conditions that they have been intended for. However, they can not meet the ever-higher demands for the cooling of the machine taken as a whole. In other words, the intense development and thereby optimizing of the cooling of the actual rotor plate stack has resulted in that the above mentioned parts of the machine have come to constitute an obstacle to a maximum power output.

SUMMARY OF THE INVENTION

A basic object of the invention is therefore to provide, in a rotary electric direct current machine, an improvement in the cooling of the coil ends or end windings of the rotor coils, that is proportional to the development that has taken place with regard to the cooling of the rest of the machine. In particular, the object is to provide this improved cooling without any negative effect upon the coil support in other respects, and with simple and inexpensive means.

In accordance with the invention this is achieved by providing the rotary electric direct current machine with a rotor coil support having a surface area that is considerably enlarged in relation to its circumference, as is specified in the characterizing portion of claim 1. Regarded as a whole, this results in a significant improvement of the cooling capacity by providing efficient cooling also of the parts of the rotor coil ends/end windings bearing on the rotor coil support.

According to an advantageous embodiment of the basic aspect of the invention the rotor coil support is provided at its inner side with a configuration enlarging its surface area. This configuration has the shape of cooling fans or flanges directed generally radially inwardly towards the rotor shaft. This feature of the invention is specified in the enclosed claim 2. This feature achieves the desired cooling of the coil ends in a particularly efficient way.

In an embodiment of the invention that is specified in claim 3, the cooling flanges are in themselves provided with a grooved or serrated surface, whereby is achieved a further enlargement of the surface and a further improved cooling capacity.

In accordance with an embodiment specified in claims 4 and 5, at least some of the cooling flanges are configured so that they together serve as attachments for balance weights. In this manner the cooling flanges serve the additional purpose of balancing of the rotor. Hereby, the traditionally provided balance disc or corresponding means supported on the rotor shaft can be eliminated altogether.

A further advantageous embodiment of the invention is specified in claim 6. In accordance therewith a centering and fixing of the rotor coil support relative to the rotor is achieved by the fact that a number of the cooling flanges of the rotor coil support are provided with seats for guide pins that may be connected to the axial end of the rotor.

In accordance with a further embodiment of the invention the rotor coil support is formed by a number of interconnectable segments, such as is specified in claims 7 and 8. Such a design contributes to the lowering of the manufacturing cost, since the extrusion tool may be manufactured at a significantly lower cost.

In accordance with another aspect of the invention a rotor for a rotary electric direct current machine is provided. Said rotor is provided with a rotor coil support having a surface area that is considerably enlarged in relation to its circumference, as is specified in the characterizing portion of claim 9. Such a rotor can be useful both as a spare part for a direct current machine or as a replacement part in connection with the upgrading of an existing machine.

Embodiments of this second aspect of the invention are specified in the dependent claims 10–16.

In accordance with a further aspect of the invention a rotor coil support is provided, having a surface area that is considerably enlarged in relation to its circumference, as is specified in the characterizing portion of claim 17. Such a rotor coil support can be useful both as a spare part for a direct current machine or as a replacement part in connection with the upgrading of an existing rotor.

Embodiments of the last mentioned aspect of the invention are specified in the dependent claims 18–25.

Further objects, features and advantages of the invention are explained more closely in the following description of exemplifying embodiments thereof.

BRIEF DESCRIPTION OF THE DRAWINGS

The invention shall now be described in closer detail in connection with the accompanying drawings, in which:

FIG. 2A is a schematic cross-sectional view of a rotor employing the rotor coil support taken along line 2A—2A of FIG. 2.

DETAILED DESCRIPTION

Figure 1:
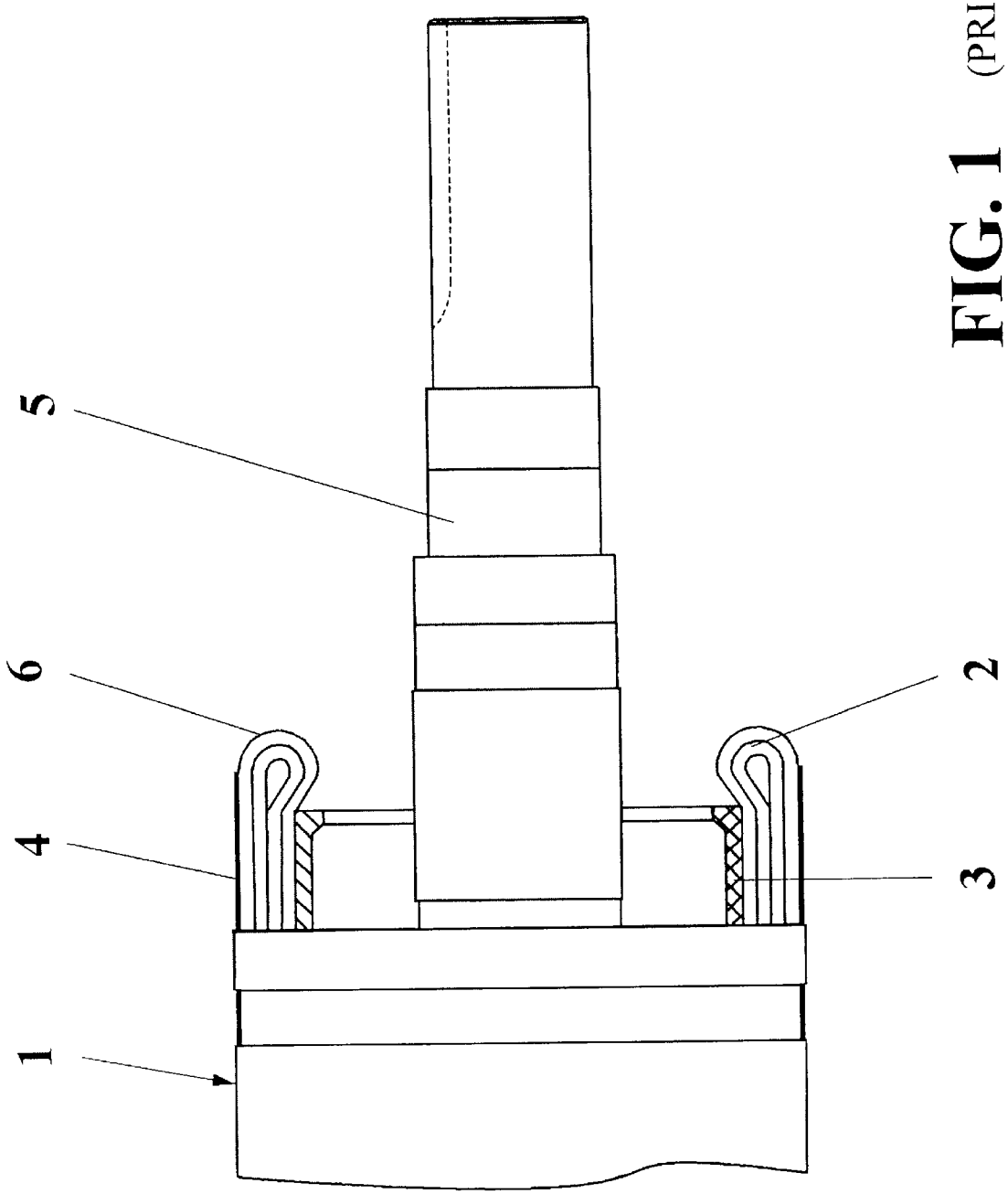
FIG. 1 in a partially schematical and partially sectioned side view illustrates a part of a rotor having a conventionally designed rotor coil support.
Figure 2:
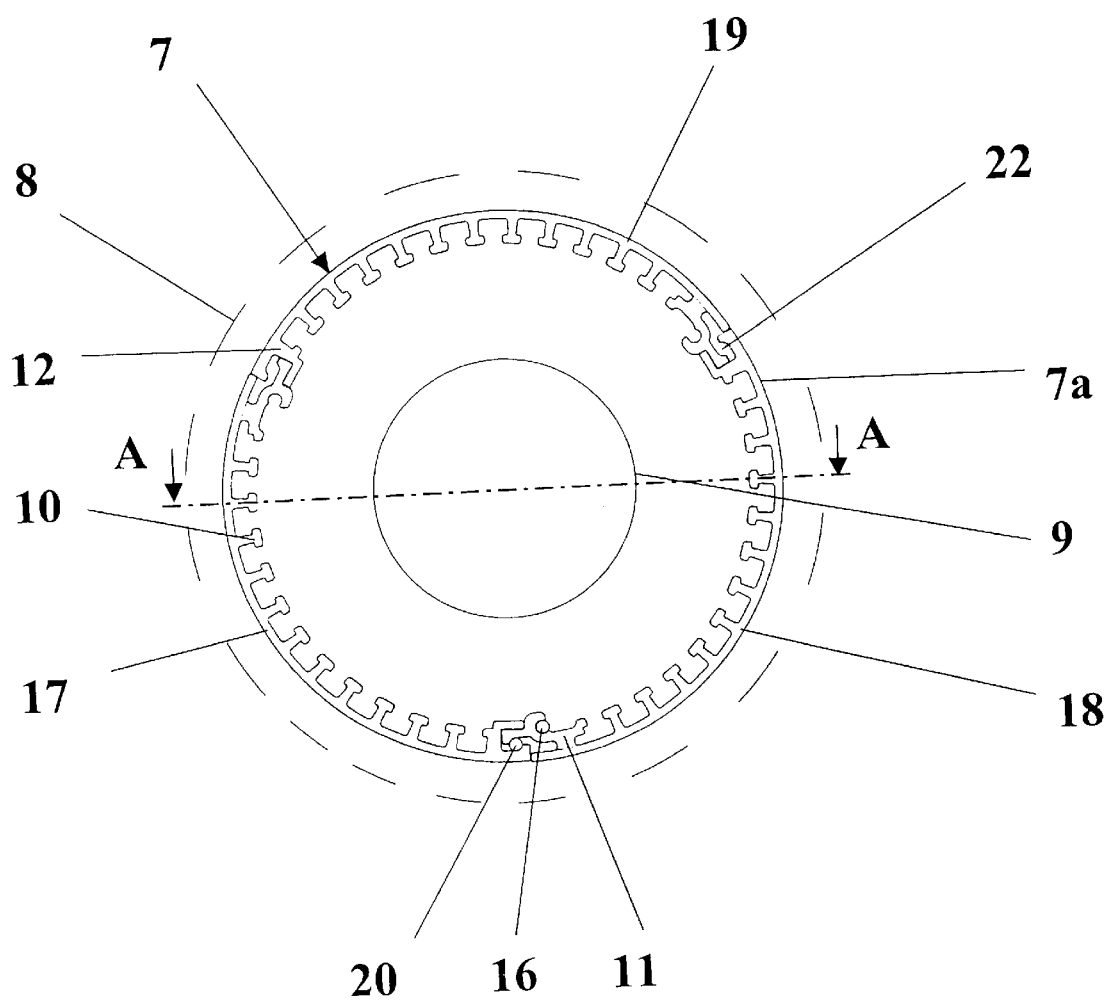
FIG. 2 illustrates a first embodiment of a rotor coil support according to the invention, in the shape of a ring formed by segments.

With reference to the drawing figures the basic principles of the invention shall now be described with the aid of two exemplifying embodiments thereof. At the same time the differences in comparison with conventionally employed designs, such as the one that has been briefly described in the introduction and that is illustrated in FIG. 1, shall be explained. Accordingly, FIG. 2 illustrates a first embodiment of a rotor coil support according to the invention, which is generally designated by the reference number 7. The axial end view of FIG. 2 illustrates that the rotor coil support 7 according to the invention is of the general type described in the introduction, in connection with FIG. 1. This type of rotor coil support has the shape of a relatively thin ring provided with a smooth outer peripheral surface, which is intended to support the ends of the rotor coils. The ring of this rotor coil support 7 is adapted to be attached directly to the outer region of the axial end of the rotor plate stack, centered with reference to the rotor 8 shaft 9.

In the embodiment illustrated in FIGS. 2–2A, the ring shape of the rotor coil support 7 is formed by interconnecting three identical component segments 17, 18, 19. One of these component segments 17 is illustrated in an enlarged scale in FIG. 3. Such a split design is advantageous with regard to the manufacturing cost. The reason for this is that i.e. an extrusion tool of the corresponding design is significantly cheaper than a tool for a continuous ring of the kind described below, in connection with FIG. 4. Although, in the illustrated embodiment, the number of segments is three, this number can be varied optionally, for instance depending upon the rotor diameter, with obvious practical limitations, such as with regard to the handling thereof.

It has been stated in the introduction that the basic object of the invention is to provide an improved cooling of the ends of the rotor coils that corresponds to the progress that has been made with regard to the cooling of the rotor plate stack. For this purpose and in accordance with the invention, it is now basically suggested that the rotor coil support 7 be formed having a surface area that is considerably enlarged in relation to its circumference. In the illustrated embodiment this is achieved by providing the coil support 7 with cooling flanges 10, 11, 12 that are distributed over its inner peripheral surface and that are generally directed radially inwardly towards the rotor shaft 9 indicated in FIG. 2. In the illustrated embodiment the cooling flanges are provided having their longitudinal extension in the axial direction of the ring shape. However, within the scope of this invention the cooling flanges could theoretically be positioned in any other direction, such as in the circumferential direction.

Furthermore, it shall be clarified, that although the drawing figures do not illustrate the width of the ring shape, that is its axial extension, the rotor coil support 7 shall have such a dimension adapted to the length of the coil ends that protrude outside the rotor plate stack 8 and that shall be supported, corresponding to the illustration in FIG. 1. With regard to the cooling flanges 10, 11, 12, it is assumed in FIGS. 2 and 3, that these extend over the full width of the coil support 7. The purpose of this is to obtain the maximum cooling effect or capacity, but it is obvious that the invention also comprises other specific designs, even axial rows of mutually separate flanges, all depending upon the desired cooling effect.

In the illustrated embodiment with three segments 17, 18, 19 each segment is provided with what can be called "standard cooling flanges" 10 over the major part of its radially inner surface. In its first and second ends respectively, it is provided with "special cooling flanges" 11 and 12 respectively. In addition to their function as a cooling flange they also serve as complementary interconnectable "male coupling member" and "female coupling member" for the mutual connection of the segments 17, 18, 19 to form a ring shaped coil support 7. Such a mutual connection of ring segments is known in itself within other fields of application.

For this interconnecting function the "male coupling member" 11 is provided with a protruding engagement portion 11a adapted to be brought into engagement with a recess 21 of a receiving portion 12a of the "female coupling member" 12 of the next segment. After the interconnection of the segments these are locked to each other by knocking a pin or stud 20 into the seat 22 formed between the engagement and receiving portions 11a and 12a respectively, which have been brought together.

Figure 3:
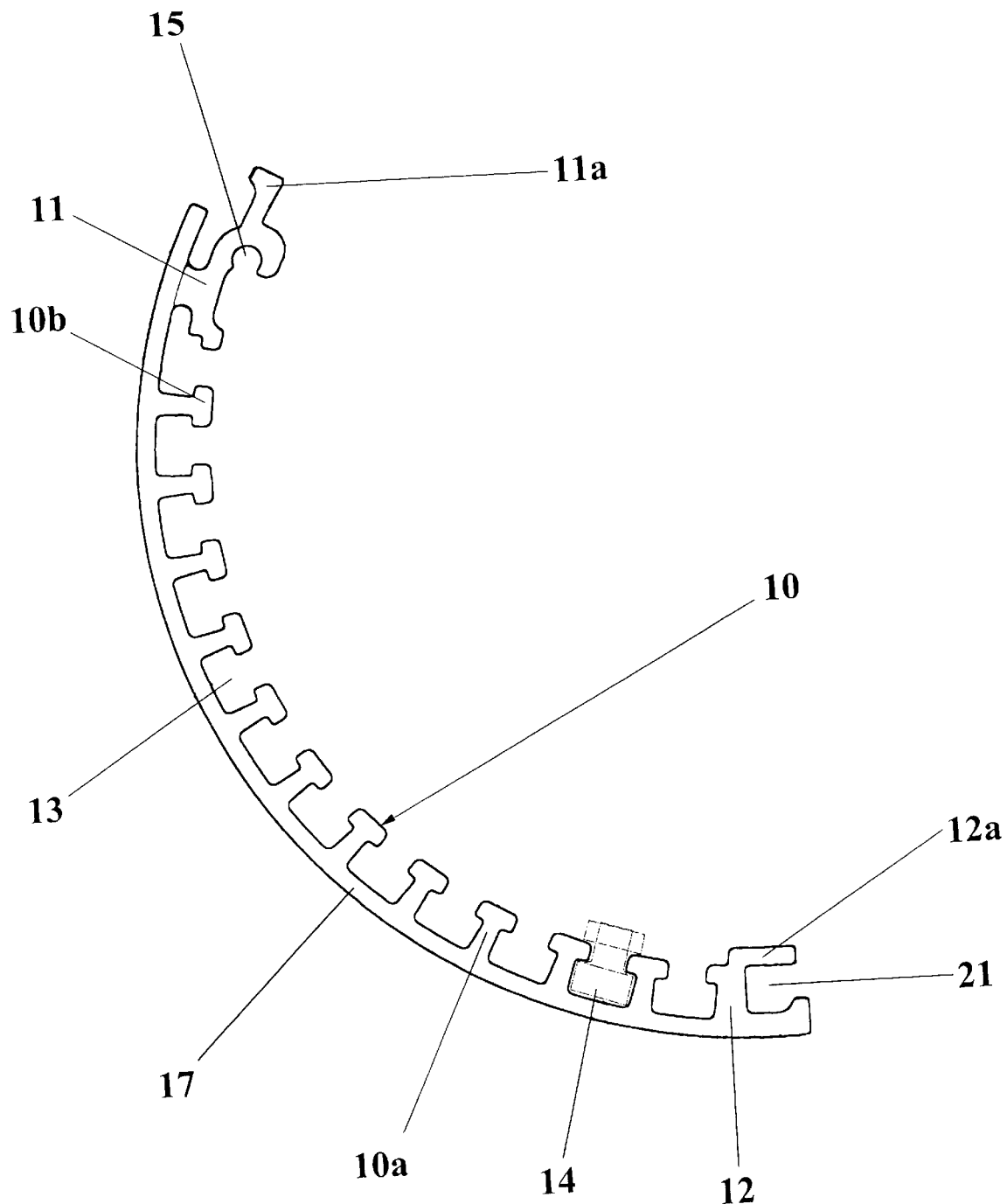
FIG. 3 illustrates a segment of the rotor coil support according to the first embodiment illustrated in FIG. 2.

It is clear from FIG. 2 and is even clearer from FIG. 3, that the cooling flange 11 forming the "male coupling member" of each segment 17, 18, 19 is also provided with a seat 15 for a guide pin or resilient tension pin 16 (see FIG. 2) that is secured in its designated bore (not shown) in the rotor plate stack 8. With guide pins 16 inserted in this manner into the seat 15 of each segment 17, 18, 19, the rotor coil support 7 is centered and retained in a very neat way during the assembly of the rotor coils on the rotor 8. Moreover, the provision of these guide pins 16 in the seats 15 provides a protection against the rotor coil support 7 spinning loose for instance during powerful deceleration. These figures also illustrate that the special cooling flanges are preferably formed somewhat heavier than the standard cooling flanges, in order to bear the loads better, which can be applied thereto during operation.

The cooling flanges 10 that were referred to above as "standard cooling flanges" are in the illustrated embodiment of a general T-shape, in cross section, with a first substantially radially extended base portion 10a. The first end of said base portion 10*a* is connected to the inner surface of the rotor coil support 7 and its second free end is connected to a second portion 10*b* extended substantially at right angles to the first portion, whereby two adjacent cooling flanges 10 between them form a T-groove 13. Forming the cooling flanges in this manner provides a very significant enlargement of the surface area of the coil support 7, and in addition thereto serves the purpose of receiving one or more balance weights. FIG. 3 indicates a balance weight configuration 14 that is suitable for use together with the T-groove, namely a balance weight in the shape of a bolt and nut. Alternatively, the T-grooves can serve the purpose of receiving rods as balance weights.

A further alternative for providing a balancing of the rotor 8, for the purpose of eliminating the need for the currently common balance discs secured to the rotor shaft 9, is that, maintaining their cooling capacity the cooling flanges according to the invention can be formed so that separate flanges may be cut off or shortened. From the above description it should be clear that the cooling flanges according to the invention are not restricted to the illustrated design, but can be formed in an optional way for achieving the desired cooling capacity for each specific application. In the cases where a maximum cooling effect is desired it will for instance be possible to provide the cooling flanges with a profiled, for instance grooved, surface 10*c* providing a further enlargement of the surface area.

The rotor coil support 7 according to the invention is basically manufactured from a nonmagnetic material having good thermal conductivity. With regard to the manufacturing technique it should also be suitable for extrusion, that is easy to extrude. It is quite possible to manufacture the rotor coil support from a synthetic resin, but a manufacturing from light metal, for instance aluminum, will probably be preferred.

Compared to what will be obtained with traditional solutions, an application of the principles of the invention upon a rotor of an electric direct current machine will basically result in a lowering of the temperature of the coil ends of up to approximately 20–25%. In accordance with the initial discussion this is a very essential and important improvement of the temperature condition in the area of the coil ends. In addition thereto, the design in accordance with the invention provides an enhanced possibility of providing a more appropriate balancing of the rotor. This is achieved by providing a possibility to perform the balancing in an easy and neat manner, directly at the rotor coil support.

Figure 4:
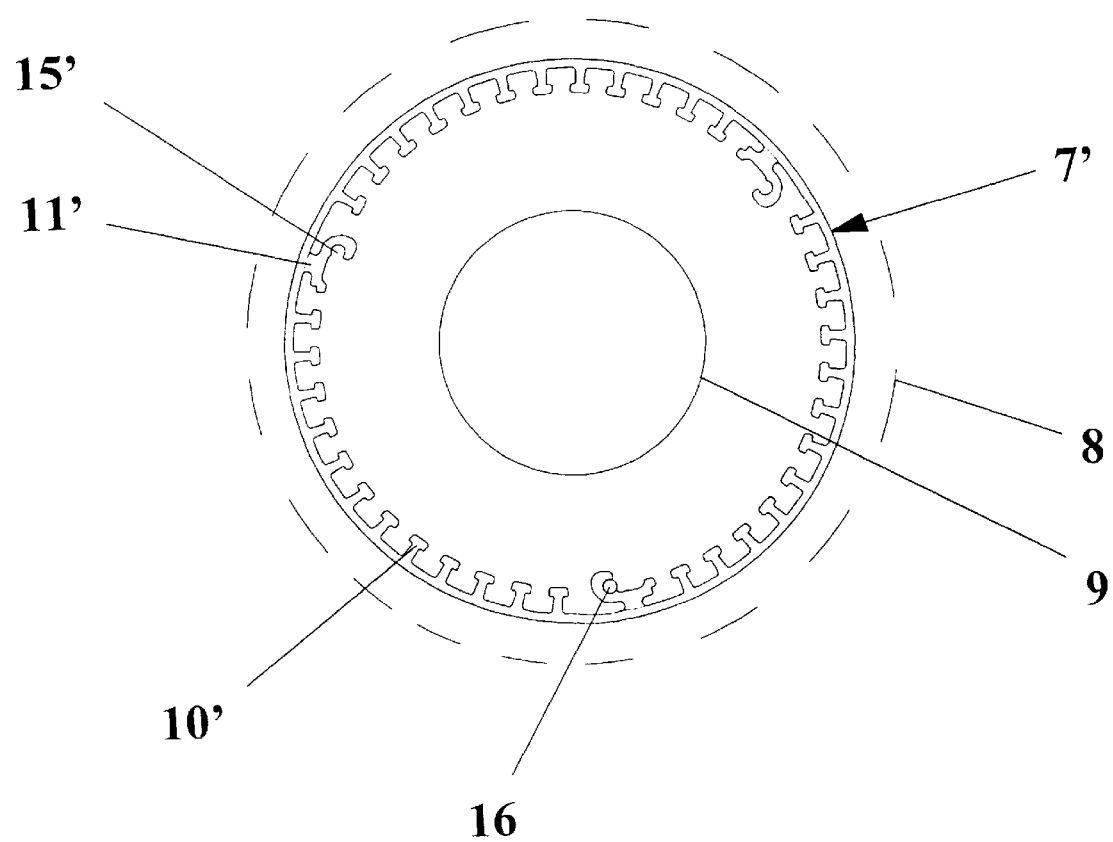
FIG. 4 illustrates a second embodiment of a rotor coil support according to the invention, formed having an uninterrupted ring shape.

FIG. 4 illustrates a second embodiment of the invention. This embodiment can be advantageous in the cases where a simpler handling will be considered to be more important than the saving in costs that will be obtained by using the ring shape according to the first embodiment, where the ring shape is formed by separate segments. Thus, in this second embodiment the rotor coil support 7' is an integral ring provided with cooling flanges 10' and 11' distributed over the radially inner surface. In this case all of the cooling flanges could consist of "standard cooling flanges" 10' corresponding to those described in connection with the first embodiment. However, in the illustrated embodiment these "standard cooling flanges" 10' are supplemented with a number of "special cooling flanges" 11' similar to the "male coupling member" 11 according to the first embodiment, except that they lack the protruding engagement portion. Thus, the special cooling flange 11' is provided with a seat 15' for receiving one of the above described guide pins 16. The purpose of the guide pins is to guide the coil support 7' and to secure it against rotation, and they are formed slightly heavier to better withstand the load that may be applied thereto by the guide pin 16.

The invention is presently regarded as having its major field of application in motor operation, but an application thereof in a generator operation will likewise fall within the basic principles of the invention. In this connection it should also be made clear that although the invention has been described herein with specific reference to an application by rotary electric direct current machines, it shall not be restricted to such an application. Within the scope of this invention it also covers applications by other types of rotary electric machines.

It will be understood by those skilled in the art that various modifications and changes may be made to the present invention without departure from the scope thereof, which is defined by the appended patent claims.

What is claimed is:

1. A rotary electric direct current machine having a rotor formed with an axial end, said rotor being mounted on a rotor shaft and centered with reference to the rotor shaft, said rotor having axial winding coils, a ring shaped rotor coil support having an inner surface and an outer surface, the coil ends being supported on the outer surface of the rotor coil support, said rotor coil being supported directly at the axial end of the rotor, adjacent a radially outer region thereof, and wherein the inner surface of the ring has a surface area that is considerably enlarged relative to the outer surface of said ring.

2. A rotary electric direct current machine according to claim 1, wherein the rotor coil support is formed with cooling flanges for enlarging said area, said cooling flanges being generally directed radially inwardly towards the rotor shaft.

3. A rotary electric direct current machine according to claim 2, wherein the cooling flanges have a profiled surface.

4. A rotary electric direct current machine according to claim 2, wherein at least some of the cooling flanges include attachments for balance weights.

5. A rotary electric direct current machine according to claim 4, wherein the attachments have a first substantially radial portion having an inner end connected to the inner surface of the rotor coil support and a free end, a second portion extending substantially at right angles to the first portion, forming a T-shape, wherein two adjacent cooling flanges form a T-groove therebetween for receiving an enlarged head of said balance weights having a shape of a bolt.

6. A rotary electric direct current machine according to claim 2, wherein a number of the cooling flanges of the rotor coil support include seats and guide pins for attachment of the rotor coil support to the axial end of the rotor for centering and retaining the rotor coil support in relation to the rotor.

7. A rotary electric direct current machine according to claim 2, wherein the rotor coil support comprises a plurality of interconnectable segments.

8. A rotary electric direct current machine according to claim 7, wherein the segments have ends, wherein the cooling flanges positioned closest to the ends of each segment are formed with mutually complementary interconnectable attachments, for securing the segments to each other.

9. A rotor for a rotary electric direct current machine, said rotor being supported on a rotor shaft and formed with an axial end and having a generally ring shaped rotor coil support having a circumference being centered with reference to the motor shaft and having an inner surface and an outer surface, said support for supporting axial winding coil ends on the outer surface, and being attached to the rotor, wherein the inner surface of the rotor coil support has a surface area that is larger than the outer surface.

10. The rotor according to claim 9, wherein the rotor coil support has an inner surface formed with an enlarged surface area, including a plurality of cooling flanges directed radially inwardly towards the rotor shaft.

11. The rotor according to claim 10, wherein the cooling flanges have a profiled surface.

12. The rotor according to claim 10, wherein at least some of the cooling flanges form attachments for balance weights.

13. The rotor according to claim 12, wherein the cooling flanges forming the attachments include a first substantially radial portion, having an inner end connected to the inner surface of the rotor coil support and having a free end and a second portion connected to the free end extending substantially at right angles to the first portion, forming a T-shape, and wherein two adjacent cooling flanges form a T-groove therebetween for receiving an enlarged head of a balance weight.

14. A rotor according to claim 10, wherein the rotor has an axial end and wherein a plurality of the cooling flanges of the rotor coil support include seats and guide pins for attaching the rotor coil support to the axial end of the rotor and for centering and retaining the rotor coil support in relation to the rotor.

15. The rotor according to claim 10, wherein the rotor coil support comprises a plurality of interconnectable segments having end portions interconnectable to form the rotor coil support into the ring shape.

16. The rotor according to claim 15, having a rotor coil support comprising a plurality of segments, wherein the cooling flanges that are positioned closest to the respective end portions of each segment being formed with mutually complementary interconnectable attachments, which when assembled form a seat for receiving a pin for securing the segments together.

17. A rotor coil support for a rotor of a rotary electric direct current machine for supporting winding coil ends, wherein the rotor coil support comprises a ring having an inner surface having a corresponding surface area and an outer surface having a corresponding surface are the outer surface for supporting the winding coil ends thereon, and the surface area of inner surface being larger than the surface area of the outer surface.

18. The rotor coil support according to claim 17, wherein the ring has a radially inner surface formed with a plurality of cooling flanges that are generally directed radially inwardly.

19. The rotor coil support according to claim 18, wherein the cooling flanges have a profiled surface.

20. The rotor coil support according to claim 19, wherein at least some of the cooling flanges are formed with attachments for receiving balance weights.

21. The rotor coil support according to claim 20, wherein the attachments include a first substantially radial portion, having a proximal end connected to the inner surface of the ring and a distal free end and a second portion connected to the free end extending substantially at right angles to the first portion, forming a T-shape, such that two adjacent cooling flanges form a T-groove therebetween for receiving the balance weight having a shape of a bolt.

22. The rotor coil support according to claim 18, wherein a plurality of the cooling flanges include seats for receiving guide pins attachable to an axial end of the rotor for centering and retaining the rotor coil support in relation thereto.

23. The rotor coil support according to claim 18, wherein the rotor coil support comprises a plurality of interconnectable segments.

24. The rotor coil support according to claim 23, wherein the segments have end portions and the cooling flanges positioned closest to the ends of each segment include mutually complementary interconnectable attachments for joining the ends together to form a seat for receiving a pin for securing the segments to each other.

25. The rotor coil support of claim 17, wherein the ring is formed of a plurality of interconnected segments and at least one of said supports is formed of an extrudable material having good thermal conductivity.

26. The rotor coil support of claim 25, wherein the material is aluminum.

27. The rotor coil support according to claim 17, wherein the ring is formed of an extrudable material having good thermal conductivity.

28. The rotor coil support of claim 27, wherein the material is aluminum.

* * * * *

UNITED STATES PATENT AND TRADEMARK OFFICE
CERTIFICATE OF CORRECTION

PATENT NO. : 6,366,001 B1
DATED : April 2, 2002
INVENTOR(S) : Rune Gunnarsson et al.

It is certified that error appears in the above-identified patent and that said Letters Patent is hereby corrected as shown below:

<u>Column 6,</u>
Line 24, after "coil" insert -- support --.

Signed and Sealed this

Twenty-fourth Day of June, 2003

JAMES E. ROGAN
*Director of the United States Patent and Trademark Office*